(12) United States Patent
Chigurupati

(10) Patent No.: US 8,329,236 B2
(45) Date of Patent: Dec. 11, 2012

(54) LOW SODIUM SALT COMPOSITION

(76) Inventor: Sambasiva Rao Chigurupati, Omaha, NE (US)

( * ) Notice: Subject to any disclaimer, the term of this patent is extended or adjusted under 35 U.S.C. 154(b) by 0 days.

(21) Appl. No.: 13/106,438

(22) Filed: May 12, 2011

(65) Prior Publication Data

US 2011/0244103 A1 Oct. 6, 2011

Related U.S. Application Data

(62) Division of application No. 11/539,129, filed on Oct. 5, 2006, now Pat. No. 7,989,016.

(51) Int. Cl.
*A23L 1/304* (2006.01)
(52) U.S. Cl. ............... 426/74; 426/549; 426/649
(58) Field of Classification Search .......... 426/649, 426/549, 74
See application file for complete search history.

(56) References Cited

U.S. PATENT DOCUMENTS

| | | | |
|---|---|---|---|
| 3,514,296 A | 5/1970 | Frank | |
| 4,473,595 A | 9/1984 | Rood | |
| 5,034,378 A | 7/1991 | Cox | |
| 5,447,543 A | 9/1995 | Sadan | |
| 5,853,792 A * | 12/1998 | Zolotov et al. | 426/649 |
| 5,871,803 A | 2/1999 | Bonorden | |
| 6,541,050 B1 | 4/2003 | Bonorden | |
| 6,743,461 B1 * | 6/2004 | Vasquez | 426/649 |
| 6,787,169 B1 | 9/2004 | Maki | |
| 7,402,328 B2 | 7/2008 | Vasquez | |
| 7,820,225 B2 | 10/2010 | Zuniga | |
| 7,854,956 B2 | 12/2010 | Zuniga | |
| 2006/0115518 A1 * | 6/2006 | Tsuchiya et al. | 424/439 |
| 2008/0003339 A1 | 1/2008 | Johnson | |
| 2008/0003344 A1 | 1/2008 | Jensen | |
| 2008/0008790 A1 | 1/2008 | Jensen | |
| 2008/0038411 A1 | 2/2008 | Jensen | |
| 2009/0041900 A1 | 2/2009 | Zuniga | |
| 2009/0169701 A1 | 7/2009 | Pfeiffer | |
| 2011/0052785 A1 | 3/2011 | Zuniga | |

FOREIGN PATENT DOCUMENTS

| | | |
|---|---|---|
| GB | 0318152.6 | 7/2004 |
| WO | WO2008043054 | 4/2008 |

OTHER PUBLICATIONS

Mary Ellen Kuhn, Strategies for Reducing Sodium in the U.S., Food Technology, May 2010, 34-36, United States.
Barbara Katz & Lu Ann Williams, Salt Reduction Gains Momentum, Food Technology, May 2010, 25-32, United States.
Christopher M. Parry & Johannes Le Coutre, Monkeying Around With Taste, FoodScienceCentral.Com, May 5, 2005, United States.
Nathan Gray, Taste Receptors Understanding May Hold Key for Low-Cal Sweeteners: Review, FoodNavigator.Com, Mar. 3, 2011, United States.

(Continued)

*Primary Examiner* — Helen F Heggestad
(74) *Attorney, Agent, or Firm* — Polsinelli Shughart PC

(57) ABSTRACT

The present invention relates to a low sodium salt composition and the methods used to make it. The low sodium salt composition includes sodium chloride and a modified chloride salt composition. The modified chloride salt composition includes a homogenous amalgamation of chloride salt, food grade acidulant, and carrier, which does not contain sodium chloride. The low sodium salt composition is made using a two step. The first step includes making a modified chloride salt composition and the second step includes combining the modified chloride salt composition with sodium chloride to form a low sodium salt composition.

59 Claims, 13 Drawing Sheets

1st Generation (Dry Mix)

2nd Generation (Agglomeration)

KCl     Modifier     Carrier

OTHER PUBLICATIONS

Fidel Toldra & Jose M. Barat, Recent Patents for Sodium Reduction in Foods, Jul. 25, 2008, vol. 1, No. 1, Bentham Science Publishers Ltd., United States.

Thomas Hofmann, Chi-Tang Ho & Wilhelm Pickenhagen, Challenges in Taste Research Present Knowledge and Future Implications.

* cited by examiner

1st Generation
(Dry Mix)

2nd Generation
(Agglomeration)

Carrier modified KCl
(Single Crystal)

KCl     Modifier     Carrier     Carrier modified KCl

FIG. 9

Sensory Testing Data Contd.,
@ Food Perspectives in Mpls.

N = 100 (25 per session)

Applied to 1# of Fresh French Fries (450g); post-fry weight is approx. 300g (33% shrink).

Product types:  1.5g of Test Salt *
 1.5g of Diamond Crystal French Fry Salt

| Product type | Inputs of Na and K (mg per 100g) | | Recovery of Na and K ("as eaten") (mg per 100g) | |
|---|---|---|---|---|
| | Na | K | Na | K |
| 1.5g Diamond Crystal | 200 | 0 | 207 | 438 |
| 1.5g Test Salt | 135 | 65 | 120 | 492 |

*Test Salt is S&P Salt Sub, with 27% Na and 13% K. (This is 1/3$^{rd}$ less Na than the Regular Salt or Diamond Crystal Salt).

FIG. 10

French Fries Test Results

There were virtually no differences between french fry salt and S&P Salt.

| Attributes | 1.5g French Fry Salt | 1.5g S&P Salt (42% less sodium) |
|---|---|---|
| Overall Appearance | 6.9 | 7.2 |
| Overall Liking | 7.2 | 7.2 |
| Overall Flavor | 7.2 | 7.1 |
| Overall Texture | 7.1 | 7.2 |
| Overall Saltiness | 6.3 | 6.1 |

N = 100
Scores are based on a nine-point hedonic scale, where 1 = dislike extremely, 5 = neither like nor dislike, and 9 = like extremely.
Test conducted at Food Perspectives, Minneapolis, MN

FIG. 11

RESULTS FROM FOOD PERSPECTIVES contd.,

Intensity Analysis

- There were no perceivable differences in the intensity of the Aftertaste among the four samples.
- There were no perceivable differences in the greasiness of the mouthfeel among the four samples.

*Table 4: Complete Intensity Results by Sample*

|  | 1.5g Diamond Crystal French Fry Salt | 1.5g S&P #27/13 Test Salt |
|---|---|---|
| Mouthfeel (not at all greasy-very greasy) | 3.2 | 3.3 |
| Saltiness (not at all salty-very salty) | 3.7 | 3.5 |
| Aftertaste (no aftertaste-strong aftertaste) | 2.9 | 2.8 |

Notes:

- Scores are based on a seven-point hedonic scale, where 1 = not at all and 7 = very.
- Samples not sharing a letter on a single row (e.g., "a" vs. "b") are significantly different at the 95% confidence level ($p<0.05$).
- Rows without letters indicate no significant difference between samples for that attribute.

FIG. 12

Sliced Deli Ham Test Results

There were virtually no differences between salt and S&P Salt.

| Attributes | Regular Salt | S&P Salt (33% less sodium) |
|---|---|---|
| Texture | 9.22 | 9.40 |
| Ham Flavor | 7.77 | 8.26 |
| Salt Level | 7.35 | 7.61 |
| Salt Intensity | 6.87 | 7.06 |
| Off Flavor | 5.91 | 6.24 |
| Aftertaste | 8.31 | 8.05 |
| Overall Acceptability | 8.20 | 8.28 |

N = 38
Scores are based on a fifteen-point hedonic scale, where 1 = dislike extremely, 7.5 = neither like nor dislike, and 15 = like extremely.
Test conducted at the University of Nebraska.

FIG. 13

SENSORY EVALUATION OF SLICED HAM SAMPLES
Contd.,

Footnotes:

(1) Rated from 0 = very undesirable ; and 15 = very desirable
(2) Rated from 0 = not very firm; and 15 = very firm
(3) Rated from 0 = lacking; and 15 = intense
(4) Rated from 0 = not enough salt; and 15 = too much salt

Comments quoted from Dr.Susan's Report:

"S&P Sample was the Saltiest of all"

"S&P Sample was closest to being 'just about right' for Salt intensity"

"S&P Sample had the highest level of Ham flavor"

LOW SODIUM SALT COMPOSITION

CROSS-REFERENCE TO RELATED APPLICATION

This application claims benefit of U.S. application Ser. No. 11/539,129, filed Oct. 5, 2006 and is a divisional application thereof.

FIELD OF THE INVENTION

The present invention relates to a low sodium salt composition that includes a combination of sodium chloride and modified chloride salt, and the methods of making it. More particularly, the invention relates to a modified chloride salt composition that includes a homogenous amalgamation of chloride salt, food grade acidulant, and carrier. Further, the modified chloride salt composition may be combined with sodium chloride to produce a low sodium salt composition.

BACKGROUND OF THE INVENTION

Salt, or sodium chloride (NaCl), is well known. While salt imparts a desirable flavor to food, too much use can result in long term adverse health risks. Because of the proliferation of salt in prepared foods and other products found in a grocery store, many people exceed the average recommended daily intake. Exceeding the recommended daily intake of sodium is a significant risk factor in developing high blood pressure and a cause or contributing factor in the rising incidence of heart disease. As such, medical professionals and governmental authorities recommend a reduction in per capita salt consumption of from about 10 to 12 g per day to a level of about 6 g per day, which is equivalent to 2400 mg of sodium.

The most recent Dietary Guidelines issued in the U.S. suggest a proposed consumption limit of 2400 mg of sodium per day and the National Academy of Science (NAS) even suggests a more stringent limit of 1500 mg of sodium per day. The NAS also recommends a potassium consumption limit of 4,700 mg per day. Typically potassium consumption is less than half of that level.

Because of these and other reasons, there are a variety of salt substitutes in the market. The classical approach to production of salt substitutes involves combining the sodium and potassium salts, or occasionally magnesium salts, in various ratios and adding a wide variety of other additives to this mix. The other additives are generally added to mask or at least partially reduce the generally metallic/bitter taste of potassium that has generally been associated with salt substitutes containing potassium. The processing techniques used to make these products include, among others, simple blending, agglomeration, extrusion cooking, and the like.

Examples of salt substitutes are numerous. One type relates to a salt substitute that includes an inner core of potassium chloride coated with a maltodextrin, an inner core of potassium chloride coated with a mixture of maltodextrin and sodium chloride, and an inner core of potassium chloride coated with a mixture of maltodextrin, sodium chloride, and cream of tarter (potassium bitartrate). The process of making these salt substitutes includes coating the potassium chloride with a solution of maltodextrin, maltodextrin and sodium chloride, or a mixture of maltodextrin, sodium chloride, and cream of tarter. As can be seen, a complex mixture of potassium chloride product is formed.

The deficiency with these salt substitutes is that the sodium chloride is reacting with the maltodextrin and the potassium chloride. Although the maltodextrin does mask the bitter/metallic flavor of the potassium chloride, the reaction of the three components changes the sodium chloride's "salty flavor" that is desired by the consumer. Accordingly, a need still exists for salt compositions, which have the same taste and appearance to salt, and are easy and inexpensive to make.

BRIEF DESCRIPTION OF THE DRAWINGS

The following drawings form part of the present specification and are included to further demonstrate certain aspects of the present invention. The invention may be better understood by reference to one or more of these drawings in combination with the detailed description of specific embodiments presented herein.

FIG. 9 depicts the testing parameters and materials used for sensory testing of French fries.

FIG. 10 depicts the sensory test results using a nine-point hedonic scale for French fries.

FIG. 11 depicts the food perspective results using a seven-point hedonic scale for French fries.

FIG. 12 depicts the sensory test results using a fifteen-point hedonic scale for sliced deli ham.

FIG. 13 depicts the sensory evaluation for the sliced deli ham sensory tests.

SUMMARY OF THE INVENTION

Figure 1A:
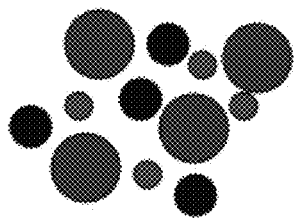
FIG. 1 illustrates the particle arrangement of sodium-replacement compositions known in the art (FIGS. 1A & 1B) in comparison to the composition of the present invention (FIG. 1C).

The present invention is directed to a low sodium salt composition and the components thereof. In particular, the present invention is directed to a low sodium salt composition containing unprocessed sodium chloride and a modified chloride salt product.

The modified chloride salt composition of the present invention is a homogeneous amalgamation of chloride salt, food grade acidulant, and carrier. Each particle comprising the modified chloride salt composition contains a homogeneous mixture of chloride salt, food grade acidulant, and carrier molecules throughout its form. The individual components of chloride salt, food grade acidulant, and carrier are not identifiable within each particle of the composition under magnification.

Suitable chloride salts of the modified chloride salt include potassium, magnesium, calcium, ammonium, and combinations thereof. Preferably, the chloride salt is magnesium chloride, potassium chloride, or a combination thereof. Alternatively, the chloride salt is preferably potassium chloride.

The modified chloride salt may include from about 2.5% to about 80% by weight chloride salt. Preferably, the modified chloride salt includes about 5, 10, 15, 20, 25, 30, 35, 40, 45, 50, 55, 60, 65, 70, or 75% by weight chloride salt. More preferably, the modified chloride salt includes from about 15% to about 30% by weight chloride salt.

Suitable food grade acidulants include citric acid, malic acid, tartaric acid, fumaric acid, lactic acid, acetic acid, benzoic acid and combinations thereof. Preferably, the food grade acidulant is citric acid.

The modified chloride salt may include about 0.1% to about 10% by weight food grade acidulant. Preferably, the modified chloride salt includes about 0.1, 0.25, 0.5, 0.75, 1.0, 1.25, 1.5, 1.75, 2.0, 2.5, 3.0, 3.5, 4.0, 4.5 or 5.0% by weight food grade acidulant. More preferably, the modified chloride salt includes about 0.1% to about 3% by weight food grade acidulant.

Suitable carriers include starch molecules such as cereal starches, cereal flours, dextrin, maltodextrin, monosaccharide, and combinations thereof. Suitable monosaccharides include sucrose, glucose, xylose, ribose and combinations thereof. The preferred carrier may depend upon the drying technique used to produce the modified chloride salt composition. For instance, a carrier that is a cereal flour or cereal starch such as rice flour may produce a better product if drum drying is used. In contrast, a carrier that is a maltodextrin or monosaccharide may produce a better product if spray drying is used.

The modified chloride salt may include about 1% to 75% by weight carrier. Preferably, the modified chloride salt includes about 2, 4, 5, 6, 7, 8, 9, 10, 11, 12, 13, 14, 15, 16, 17, 18, 19, 20, 21, 22, 23, 24, 25, 26, 27, 28, 29, 30, 35, 40, 45, 50, 55, 60, 65, or 70% by weight carrier. More preferably, the modified chloride salt includes from about 10% to about 25% by weight carrier.

The modified chloride salt composition of claim may also include an additive selected from the group consisting of an antioxidant, a phosphate, a colorant and combinations thereof.

The present invention also contemplates a low sodium salt composition that includes a modified chloride salt composition and sodium chloride. The modified chloride salt composition is described above. Suitable sodium chloride includes sodium chloride that has not been processed with the modified chloride salt. By way of example, if the modified chloride salt composition was made with a heating step or a step where the pH was lowered, a suitable sodium chloride for the present invention is sodium chloride that has not been heated or treated to adjust pH levels.

The low sodium salt composition of the invention may also contain additives. Suitable additives may include antioxidants, phosphates, colorants, anti-caking agents and combinations thereof.

The low sodium salt composition of the invention has lower sodium content than that of regular table salt. Preferably, the composition contains about 10-90%, lower sodium than regular salt. More preferably, the composition contains about 25%, 30%, 35%, 45%, 50%, 55% or 75% lower sodium than regular salt. More preferably, the composition contains about 50% less sodium than regular salt.

The low sodium salt composition of the invention may be in liquid or solid form. The state of the composition depends upon the intended use. Suitable uses of the compositions of the invention include as a common salt substitute for the production of products in the food industry or as spice mixtures. Exemplary products the compositions may be used in include soups, sauces, baked goods, meat products, dairy products, and breakfast cereals. Furthermore, the compositions may be used as table salt. Also, the compositions of the invention may be used in food products.

DESCRIPTION OF THE PREFERRED EMBODIMENTS

In accordance with the present invention, a process for making a salt composition having the same appearance and taste as salt, while having a reduced sodium content, has been discovered. As used herein, salt, unless modified by another word (i.e. reduced-salt, potassium salt, calcium salt and the like) or used itself to modify another word (i.e. salt substitute, salt composition and the like), means sodium chloride (NaCl).

Related to that process, the resultant low sodium salt composition that includes sodium chloride and a powdered or granular carrier modified chloride salt has been discovered. As used herein, a chloride salt may be any single compound such as a chloride of potassium, magnesium, calcium, lithium, ammonium, or a mixture thereof, other than a chloride of sodium. The carrier modified chloride salt includes a mixture of a chloride salt, a modifier, and a carrier. The modifier helps to at least partially dissolve the chloride salt making it easier for it to bind to the carrier. The carrier binds the modified chloride salt and in combination with the modifier reduces the bitterness and off-flavors associated with the chloride salt. In addition, the carrier modified salt has the appearance and taste of salt, i.e. sodium chloride.

The process of making the salt composition of the present invention includes contacting a chloride salt and a modifier to form a modified chloride salt product, mixing the product with a carrier to form a carrier modified chloride salt solution, and then drying the solution to form a powdered or granular carrier modified chloride salt. The process also includes blending the powdered or granular carrier modified chloride salt with sodium chloride to form a dry mixture and grinding the dry mixture to form the salt composition.

The process of making the salt composition ensures that the sodium chloride (NaCl) remain in its natural, unaltered state. By ensuring that the NaCl remain in its natural state, it is believed that the saltiness and flavor associated with NaCl will not be altered. As such, the salt composition of the present invention, that includes both NaCl and the carrier modified chloride salt, has less sodium, but still has the same saltiness, taste, and appearance of a composition that includes only NaCl.

The first step of the process includes forming a powdered or granular carrier modified chloride salt. First, the process includes contacting or mixing a chloride salt and a modifier in an aqueous solution to form a modified chloride salt product. As discussed above the chloride salt may be any compound such as a chloride of potassium, magnesium, calcium, lithium, ammonium, or a mixture thereof, other than sodium. Preferably, the chloride salt is potassium chloride. The modifier may be any compound that increases the relative solubility of the chloride salt, at least partially dissolving it, and lowers the pH of the mixture of chloride salt, modifier, and water. Preferably, the pH is lowered below a pH of about 10, 9, 8, 7, 6, 5, 4, 3, 2, or 1. More preferably, the pH is lowered below a pH of about 7. More preferably, the pH is between a pH of about 3 to 4. The modifier must also be edible and be of a nature such that the taste of sodium chloride will not be significantly altered by it. The modifier, by itself or in combination with the carrier, masks the bitter or metallic off flavor associated with the chloride salt. Preferably, the modifier is a food grade acidulant. Suitable food grade acidulants include any food grade acids, such as citric acid, tartaric acid, acetic acid, malic acid, fumaric acid, lactic acid, benzoic acid and/or their derivatives, as well as natural sources of such acids, such as lemon juice or the like. Preferably, the food grade acidulant is citric acid.

The process includes mixing from about 60% to about 80% by weight water, from about 15% to about 30% by weight chloride salt, and from about 0.1% to about 3% by weight modifier. Preferably, the process includes mixing about 70% by weight water, 29% by weight potassium chloride, and about 1% by weight citric acid.

Typically, the chloride salt, modifier, and aqueous solution is mixed for a time sufficient to thoroughly dissolve the chloride salt. Generally, the chloride salt and modifier are added to a mixing vessel containing water at a temperature of from about 150° F. to about 220° F., preferably about 195° F. The mixing vessel may be any suitable vessel having a means of agitation. Thus, when mixed, a modified chloride salt product is formed.

The modified chloride salt product is then mixed with a carrier, that in combination with the modifier, masks the bitter or metallic off flavor associated with the chloride salt and forms a carrier modified chloride salt solution. In addition, the carrier is selected such that the carrier modified chloride salt has the appearance of salt, i.e. sodium chloride. As such, the carrier may be any short chained starch molecule that reacts with the modified chloride salt to reduce the bitter flavor of the chloride salt and produces a white colored finished product. Suitable carriers include monosaccharides, such as sucrose, glucose, xylose, and ribose, and dextrins, such as maltodextrin and dextrose, among others. Suitable carriers also include cereal starches such as rice starch, rice cereal, and rice flour. Preferably, the carrier is maltodextrin. Suitable maltodextrins have a degree of polymerization of from less than about 10 to less than about 30. The degree of polymerization is the length in monomeric or base units of the average linear polymer chain at time t in a polymerization reaction. The following formula is used to calculate the degree of polymerization:

$$DP = \frac{M_t}{M_0}$$

where
$M_t$=molecular weight at time t
$M_0$=molecular weight of one monomeric unit Any suitable maltodextrin may be used in accordance with the present invention. Preferably, the maltodextrin is water soluble and has a degree of polymerization of less than 10. For example, suitable maltodextrins, such as Maltrin M040, Maltrin M100, or Maltrin M150 may be purchased commercially from Grain Processing Corporation.

The process includes mixing from about 75% to about 90% by weight of the modified chloride salt product with from about 10% to about 25% by weight of the carrier to form a carrier modified chloride salt solution. Preferably, the process includes mixing about 87.5% by weight of the modified chloride salt product with about 12.5% by weight of the maltodextrin to form a carrier modified chloride salt solution. Generally the weight percentages will vary based on the carbon length of the carrier and the amount of chloride salt product used to make the solution. Typically, the modified chloride salt product is mixed with the carrier in a suitable vessel that includes an agitation means to avoid the formation of lumps in the solution. The solution is then heated to at least about 185° F. to ensure that the mixture is smooth, fairly thick and pourable. Alternatively, the solution may then be mixed with an additional amount of water to ensure that the solution is less viscous for ease of the drying process. For example, the carrier modified chloride salt solution may be mixed with from about 0% to about 40% by additional weight water prior to drying the solution.

The modified chloride salt solution is then dried to form a powdered or granular carrier modified chloride salt. Generally, any process known in the art that produces a powdered or granular carrier modified chloride salt may be used. Suitable drying processes include, without limitation, drum drying and spray drying techniques. A preferred process is spray drying. A spray drier operates by atomizing a stream of the modified chloride salt solution using hot air in a drying chamber. The atomization breaks the solution into small droplets, thereby increasing the surface area and thus the rate of evaporation. The small size of the droplets result in a relatively large surface area that dries quickly. The particles are removed from the drier typically within 30 seconds. The temperatures of the particles during the drying process can range from wet-bulb temperature of the inlet air to above 212° F. (100° C.) as they exit in the dry state. The operating conditions may be selected according to the drying characteristics of the product and the desired granule or powder size. Typically, any spray drier design may be used in accordance with the present invention. For example the drier may be designed to have co-current, counter-current, or mixed air flow. In a co-current system the drying air and particles move through the drying chamber in the same direction. In a counter-current system the drying air and the particles move through the drying chamber in opposite directions. Finally, in a mixed air flow system the particles experience both co-current and counter-current phases.

Alternatively, the modified chloride salt solution may be used in a liquid form. In this alternative, the modified chloride salt solution is blended or mixed with a dry mixture of sodium chloride to form a salt composition solution.

The second step of the process includes blending or mixing the powdered or granular carrier modified chloride salt with sodium chloride and grinding the dry mixture to form a salt composition. The present invention ensures that the sodium chloride remains in its natural, crystalline form, rather than reacting with the modified chloride salt. In addition, the process is cost effective, as only the carrier modified chloride salt solution needs to be dried. The NaCl does not need to be dried, it is only blended and ground, in its natural form, with the powdered or granular carrier modified chloride salt.

The powdered or granular carrier modified chloride salt is mixed with sodium chloride in an approximate ratio of 1/3 carrier modified chloride salt to 2/3 sodium chloride by weight in the second step. The mixing or blending of the powdered or granular carrier modified chloride salt and sodium chloride may be conducted in any suitable vessel. After the powdered or granular carrier modified chloride salt and the sodium chloride are mixed, the dry mixture may be ground or milled to the salt composition's desired particle size. Similarly to the mixing vessel, any suitable grinder or mill may be used in accordance with this invention. Alternatively, if larger particle sizes are desired the salt composition may be agglomerated or crystallized at lower temperatures.

The salt composition may have any desired particle size. The salt composition typically has a particle size larger than about 100 mesh, U.S. standard sieve size. Preferably, the salt composition has a particle size of between about 35 and about 60 mesh. It should be recognized that the particle size of the composition is selected to meet the particular end use application. "Pretzel grade" salt generally has a particle size that passes through a 35 mesh sieve, whereas "shaker grade" salt has a particle size that passes through between a 35 and a 60 mesh sieve. "Popcorn grade" salt has a particle size that passes through a 60 mesh sieve. Once ground, the salt composition should have less than about 10% of all granules, which are finer than 100 mesh. All mesh sizes are by U.S. standard sieve size.

Additionally, silicon dioxide may be included in the salt composition to prevent caking. In one aspect of the present invention from about 0.1% to about 2% by weight of silicon dioxide may be added to the composition, preferably about 1% by weight of silicon dioxide.

The resultant salt composition includes from about 10% to about 90% by weight sodium chloride, from about 2.5% to about 80% by weight chloride salt, from about 1% to about 75% by weight carrier, and from about 0.1% to about 5% by weight modifier. Preferably, the resultant salt composition includes about 50% by weight sodium chloride, about 40% by weight potassium chloride, about 8% by weight maltodextrin, and about 40% by weight citric acid.

The salt composition of the present invention includes from about 10% to about 30% by weight sodium and from about 5% to about 15% by weight potassium.

Alternatively, other additives may be included in the carrier modified chloride salt product. Suitable additives include, for example, antioxidants, to reduce the rancidity of the salted products when cooked, phosphates, to tenderize the salted food product, and/or colorants, to give the salt composition a distinct color. Suitable antioxidants include rosemary extract, butylated hydroxytoluene, butylated hydroxyanisole, and tocopherols, among others. Suitable phosphates include monosodium phosphate, tetrasodium pyrophosphate, sodium hexametaphosphate, monopotassium phosphate, tetrapotassium pyrophosphate, disodium phosphate, sodium tripolyphosphate, sodium acid pyrophosphate, dipotassium phosphate, and potassium tripolyphosphate. Suitable natural colorants include caramel color, turmeric, annatto, beta-carotene, paprika oleoresin, red cabbage juice, beet juice, grape skin extract, and carmine, among others. Alternatively, the antioxidant used may also act as a colorant. Preferably, the modified chloride salt product includes rosemary extract as an antioxidant. Rosemary extract may be included at a dosage of from about 100 ppm to about 1000 ppm by weight of the modified chloride salt product.

The salt composition of the present invention may be used as a substitute for salt, i.e. sodium chloride. Similarly, the salt composition of the present invention may be used in addition to or as a blend to salt. The salt composition of the present invention may be used in a variety of applications as table salt, inclusion in snack foods, baked goods, to season meats and poultries, and for other food items that have included salt. Preferably the salt composition of the present invention is used to injection marinate meats and poultries as the composition has a low viscosity and can be processed through a meat injection needle.

The following examples are simply intended to further illustrate and explain the present invention. The invention, therefore, should not be limited to any of the details in these examples.

DEFINITIONS

Unless defined otherwise, all technical and scientific terms used herein have the same meaning as is commonly understood by one of ordinary skill in the art. All patents, applications, published applications and other publications are incorporated by reference in their entirety. In the event that there is a plurality of definitions for a term herein, those in this section prevail unless stated otherwise.

As used herein, "agglomeration" or "dry mixture" refers to a combination or mixture of components such that the constituent components in the combination or mixture are indistinguishable from one another upon non-magnified visual inspection.

As used herein, "amalgamation" refers to a combination or mixture of components such that the constituent components in the combination or mixture are indistinguishable from one another upon magnified visual inspection.

As used herein, "homogenous" refers to a substance that is uniform throughout in composition. For instance, a homogenous mixture has the same properties throughout the sample. Examples of homogenous mixtures include brass, which is a solid solution of copper and zinc, or aqueous solutions such as thoroughly stirred mixtures of sugar in water. The term does not include heterogeneous mixtures that consist of two or more regions, or phases, that differ in properties. Heterogeneous mixtures include mixtures having different layers with each layer differing in properties. Examples of heterogeneous mixtures include a mixture of gasoline and water, where the gasoline floats on the water as a separate layer.

EXAMPLES

Example 1

Spray Drying to Make Modified Chloride Salt 30.7 lbs of water were heated in a steam kettle with a swept surface agitator to a temperature of 195° F. 12.5 lbs of potassium chloride (KCl) were then added into the hot water and mixed for 5 minutes. After that, 0.5 lbs of citric acid were added to the hot water and mixed for an additional 5 minutes until the KCl was completely dissolved.

After mixing in the citric acid, 0.025 lbs of rosemary extract were added to the mixture. Finally, 6.25 lbs of maltodextrin (Maltrin 040 purchased commercially from Grain Processing Corporation) were added to the mixture with constant agitation to avoid lumping. The final mixture of the carrier modified potassium chloride solution was heated to a minimum temperature of 185° F. The carrier modified potassium chloride solution was smooth, fairly thick, and easily pourable.

The carrier modified potassium chloride solution was then spray dried to form a powdered carrier modified potassium chloride. The liquid mixture's temperature was 175° F. The air inlet temperature was 286° F. and the air outlet temperature was 184° F. The vacuum on the drying chamber was 0.10 in/water.

The dried carrier modified potassium chloride was white in color, free flowing, and a very fine powder.

Example 2

Making Salt Composition

The powdered carrier modified potassium chloride from Example 1 was mixed in a ratio of 1/3 powdered carrier modified potassium chloride to 2/3 by weight natural, unmodified sodium chloride and 1% by weight silicon dioxide. The salt composition was then mixed and ground in an Udy Cyclone Mill through a 1 mm screen (UDY Corporation, 201 Rome Court, Fort Collins, Colo. 80524).

Example 3

Drum Drying to Make Modified Chloride Salt

Carrier modified potassium chloride was made by adding 2271 liters of water to a mix tank and heating the water to 195° F. The heated water was transferred to a Breddo Mixer and 1134 kilograms of potassium chloride was added. Once the potassium chloride was dissolved, about 27 kilograms of citric acid was added and the temperature was maintained at 155° F. The mixture was blended for about 5 minutes and had a pH of about 3.0 to 4.0. While maintaining the pH between 3 and 4, about 226.8 kilograms of rice flour was slowly added and mixed until no lumps were visible. The mixture was then transferred to a mix tank and heated to a final temperature of 175° F. The carrier modified potassium chloride mixture was then drum dried to form a powdered carrier modified potassium chloride.

Example 4

Characterization of Carrier Modified Chloride

Figure 1B:
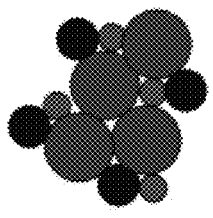
Figure 1C:
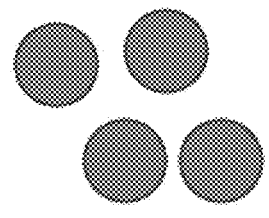
Figure 1C:
Figure 1C:
Figure 1C:
Figure 1C:

The carrier modified potassium chloride compositions made in Examples 1 and 2 were analyzed to determine their inherent properties. The Example 1 composition is a carrier modified potassium chloride ("MKCl"), which is a single crystal formed from a homogenous solution of modified potassium chloride and carrier. As depicted in FIG. 1, the MKCl of Example 1 (FIG. 1C) forms a single crystal homogenously containing the modified potassium chloride and carrier as a single amalgamation of components, rather than the dry or agglomerated, heterogeneous mixture of independent particles of carrier, modifier and potassium chloride found in low sodium salt substitutes known in the art (FIGS. 1A & 1B). The Example 2 composition is the composition of Example 1 combined with sodium chloride (S&P Salt). The carrier modified potassium chloride compositions in addition to sodium chloride and unmodified potassium chloride were analyzed using scanning electron microscopy and sensory tests.

Figure 2:
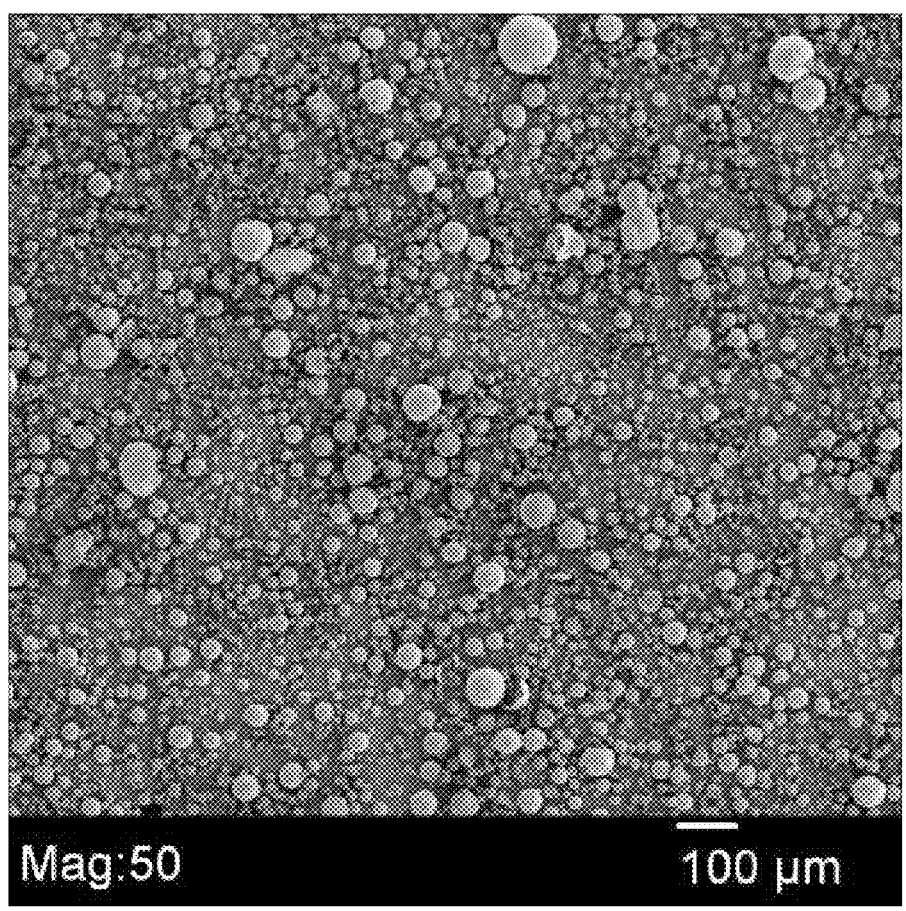
FIG. 2 shows the scanning electron microscopy image at 50× magnification for modified potassium chloride (MKCl).
Figure 3:
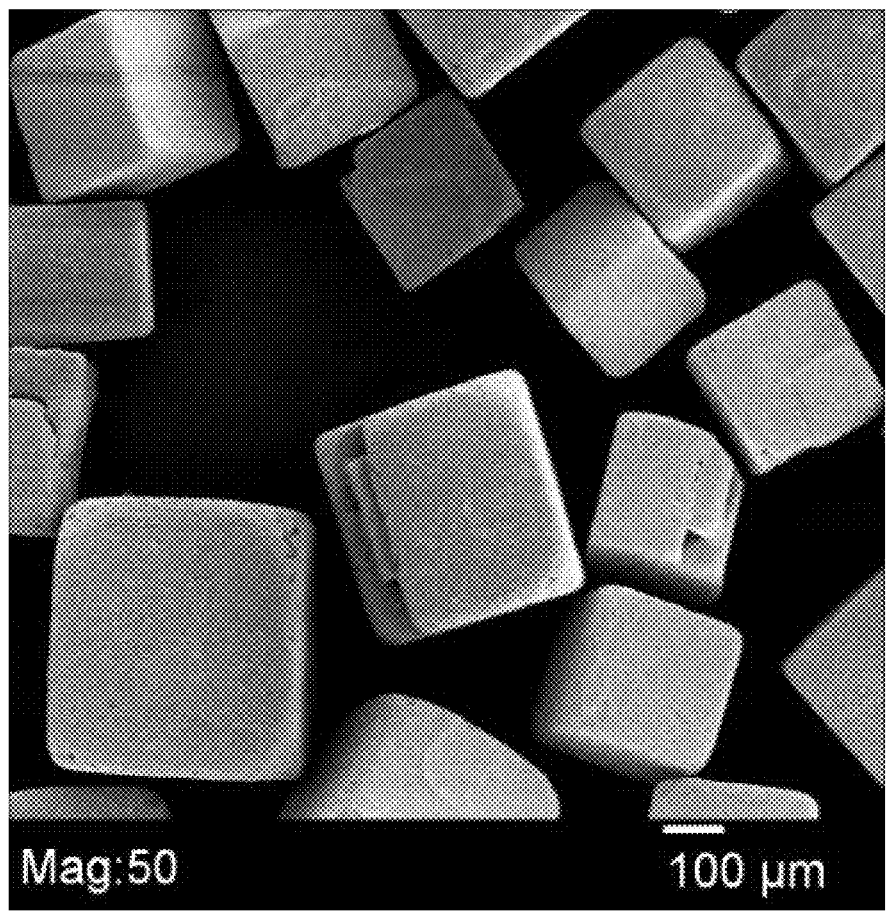
FIG. 3 shows the scanning electron microscopy image at 50× magnification for sodium chloride (NaCl).
Figure 4:
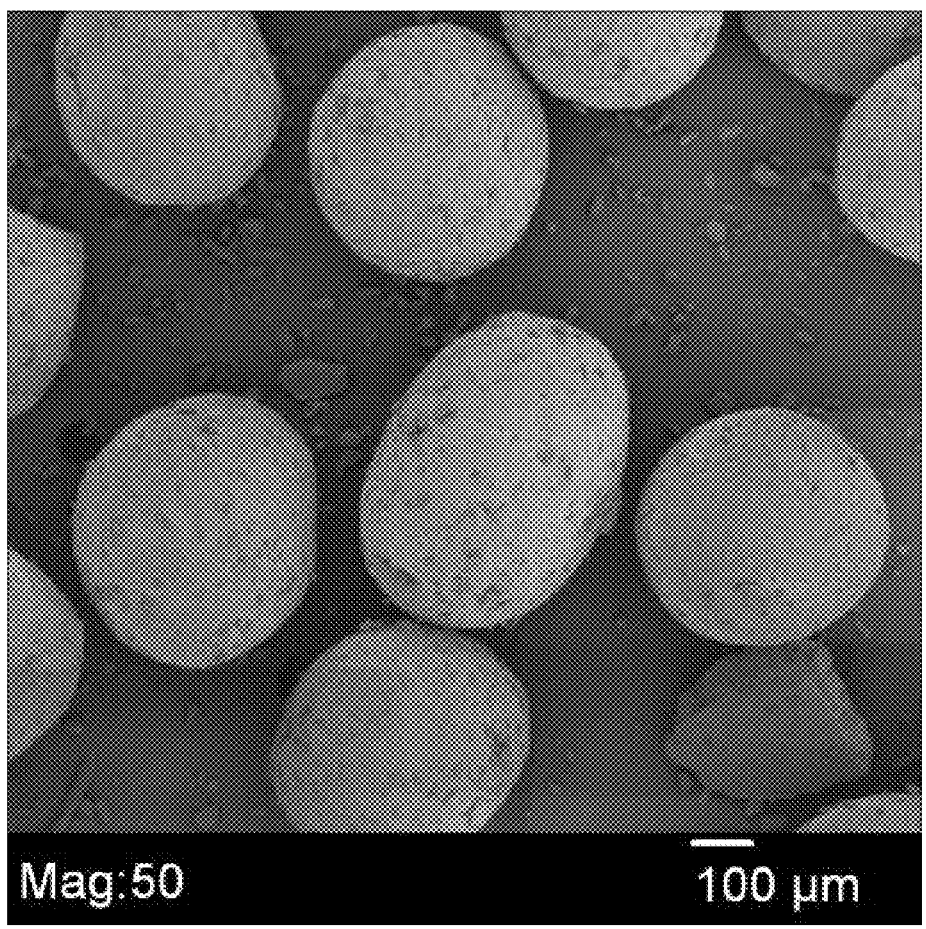
FIG. 4 shows the scanning electron microscopy image at 50× magnification for unmodified potassium chloride (KCl).
Figure 5:
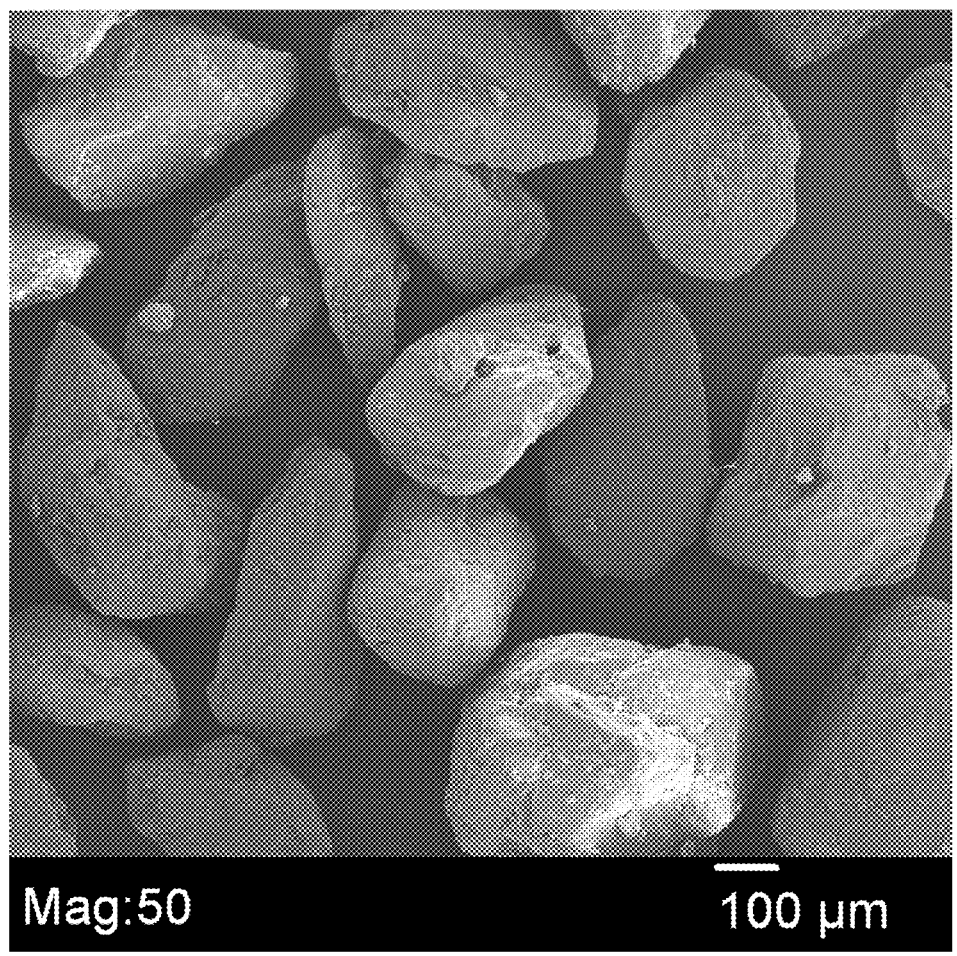
FIG. 5 shows the scanning electron microscopy image at 50× magnification for citric acid.
Figure 6:
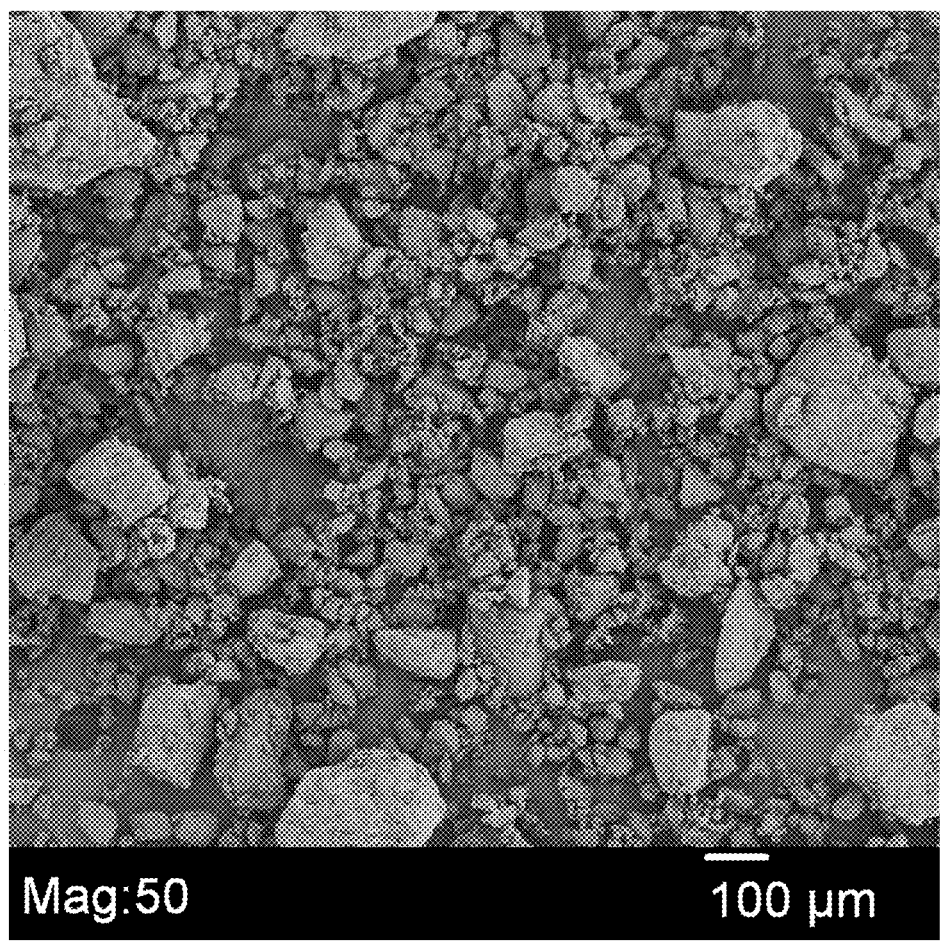
FIG. 6 shows the scanning electron microscopy image at 50× magnification for rice flour.

Scanning electron microscopy techniques were used to analyze the micro-structure of the MKCl of Example 1 (FIG. 2) in comparison with sodium chloride (FIG. 3), unmodified potassium chloride (FIG. 4), citric acid (FIG. 5) and rice flour (FIG. 6). Comparison of unmodified potassium chloride (FIG. 4) and MKCl (FIG. 2) at the same magnification showed that MKCl of Example 1 has a smaller particle size than unmodified potassium chloride. Further, the particle shape characteristics of MKCl are clearly distinct from those of sodium chloride (FIG. 3), citric acid (FIG. 5) and rice flour (FIG. 6).

Figure 7A:
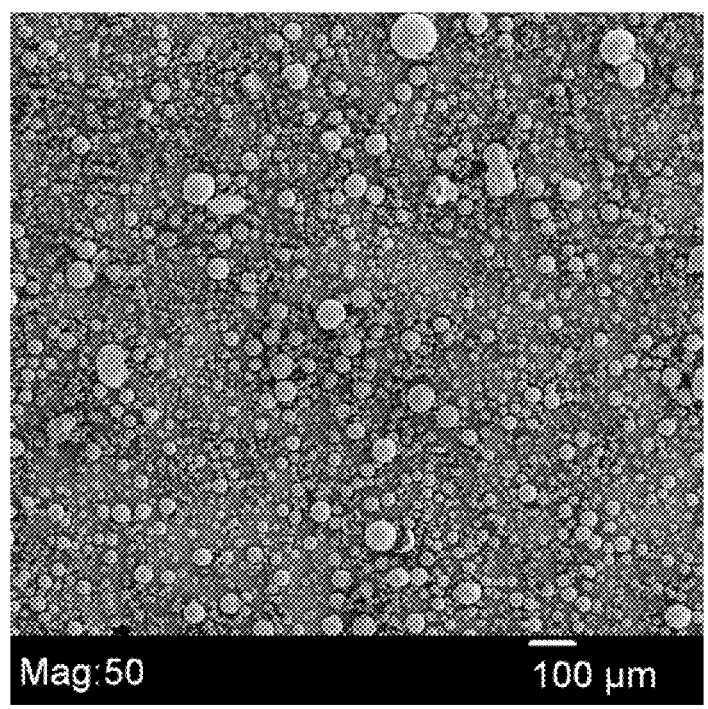
FIG. 7 shows the scanning electron microscopy image at 50× (FIG. 7A) and 500× (FIG. 7B) for spray-dried MKCl.
Figure 7B:
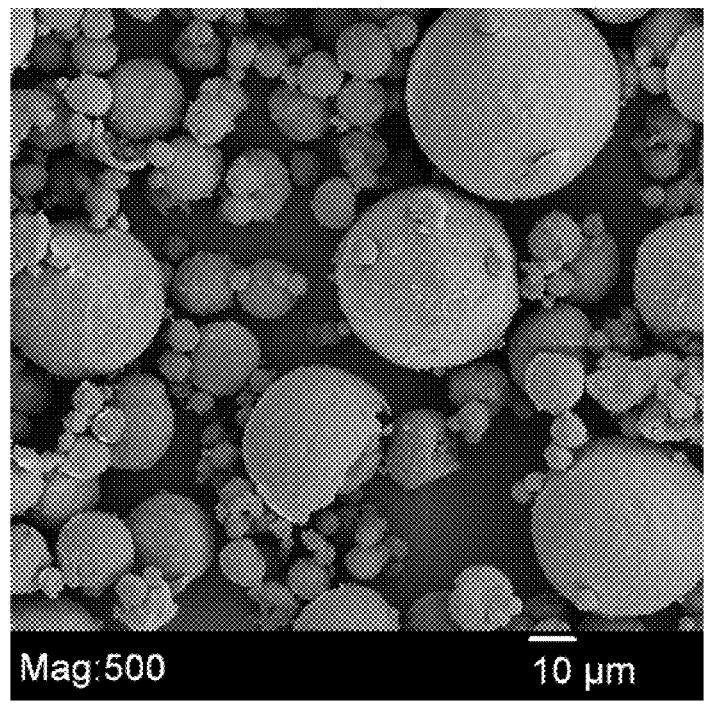
Figure 8A:
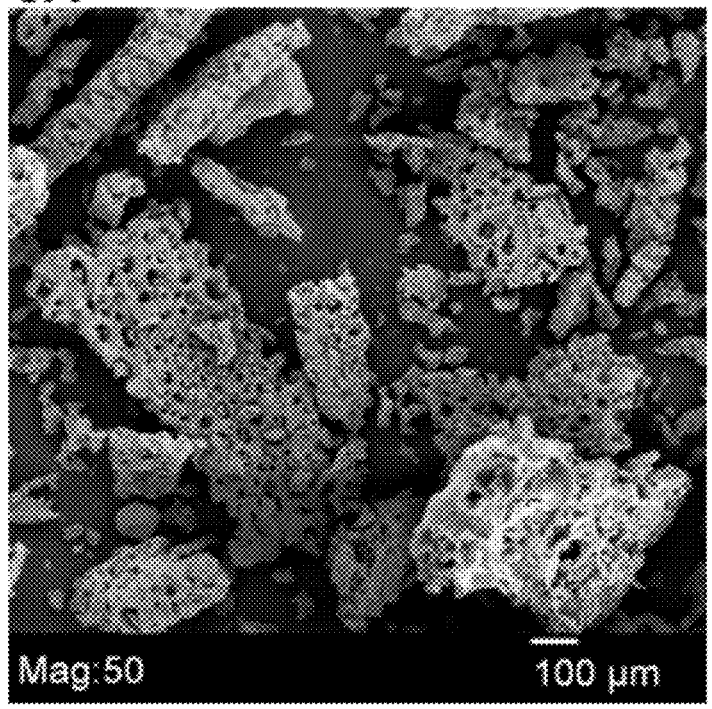
FIG. 8 shows the scanning electron microscopy image at 50× (FIG. 8A) and 500× (FIG. 8B) for drum-dried MKCl.
Figure 8B:
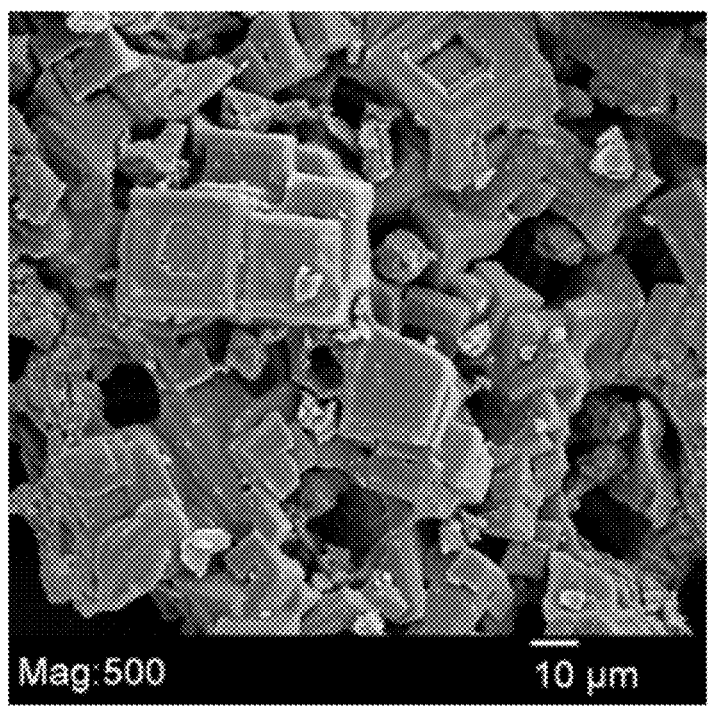

Further, scanning electron microscopy techniques were used to analyze micro-structure differences between spray-dried (SD) (FIG. 7) and drum dried (DD) MKCl (FIG. 8). Comparison of spray-dried MKCl and drum dried MKCl at the same magnification showed that MKCl has different particle characteristics depending upon the drying method used. The shape characteristics of spray-dried MKCl are clearly distinct from those of drum dried MKCl. Further, the particle shape characteristics of both spray-dried and drum dried MKCl are distinct from that of unmodified potassium chloride (FIG. 4) and of sodium chloride, citric acid, rice flour and potassium chloride.

Sensory tests were conducted to analyze the taste characteristics of the carrier modified potassium chloride composition of Example 2 in comparison with salt substitutes known in the art.

Sensory tests were conducted using French fries coated with either the salt substitute of Example 2 or a commercially available table salt substitute (Diamond Crystal Salt). The testing materials are shown in FIG. 9 and the results from the food perspectives are shown in FIG. 10. There were no differences on any Hedonic measures, such as overall liking, appearance liking, flavor liking, texture liking and saltiness liking due to either salt level or salt type (FIG. 11). There were no perceivable differences in the intensity of the aftertaste or the greasiness of the mouthfeel among the samples.

Sensory tests were also conducted using ham samples prepared with either the salt substitute of Example 2 or regular salt. The results of the sensory evaluation by 38 subjects and testing design are depicted in FIGS. 12 and 13. The salt substitute of Example 2 was found to have salt flavor that was indistinguishable from regular table salt.

The invention illustratively disclosed herein suitably may be practiced in the absence of any element, which is not specifically disclosed herein. It is apparent to those skilled in the art, however, that many changes, variations, modifications, other uses, and applications to the method are possible, and also changes, variations, modifications, other uses, and applications which do not depart from the spirit and scope of the invention are deemed to be covered by the invention, which is limited only by the claims which follow.

What is claimed is:

1. A modified chloride salt composition, consisting of from about 15% to about 90% by weight chloride salt, about 0.1% to about 5% weight food grade acidulant, and about 10% to about 25% by weight carrier, wherein the modified chloride salt comprises a homogeneous amalgamated particle of chloride salt, food grade acidulant, and carrier, and wherein the modified chloride salt does not contain sodium chloride.

2. The modified chloride salt composition of claim 1, wherein the chloride salt is selected from the group consisting of a chloride of potassium, magnesium, calcium, ammonium, and combinations thereof.

3. The modified chloride salt composition of claim 2, wherein the chloride salt is magnesium and potassium chloride.

4. The modified chloride salt composition of claim 2, wherein the chloride salt is potassium chloride.

5. The modified chloride salt composition of claim 1, wherein the food grade acidulant is selected from the group consisting of citric acid, malic acid, tartaric acid, fumaric acid, lactic acid, acetic acid, benzoic acid and combinations thereof.

6. The modified chloride salt composition of claim 5, wherein the food grade acidulant is citric acid.

7. The modified chloride salt composition of claim 1, wherein the carrier is a starch molecule.

8. The modified chloride salt composition of claim 1, wherein the carrier is selected from the group consisting of a dextrin, maltodextrin, and combinations thereof.

9. The modified chloride salt composition of claim 8, wherein the carrier is a maltodextrin.

10. The modified chloride salt composition of claim 1, wherein the carrier is selected from the group consisting of monosaccharide, disaccharide, and combinations thereof.

11. The modified chloride salt composition of claim 1, wherein the carrier is a cereal starch.

12. The modified chloride salt composition of claim 11, wherein the cereal starch is selected from the group consisting of rice starch, rice cereal, rice flour and combinations thereof.

13. A food product comprising the salt composition of claim 1.

14. The food product of claim 13, wherein the food product is selected from the group consisting of spice mixtures, soups, sauces, baked goods, meat products, dairy products, breakfast cereals, and table salt.

15. A salt composition, comprising:
   a. a modified chloride salt, wherein the modified chloride salt consists of from about 15% to about 90% by weight chloride salt, about 0.1% to about 5% weight food grade acidulant, and about 10% to about 25% by weight carrier, wherein the modified chloride salt comprises a homogeneous amalgamated particle of chloride salt, food grade acidulant, and carrier, and wherein the modified chloride salt does not contain sodium chloride and,
   b. sodium chloride, wherein the sodium chloride is not heat processed with the modified chloride salt.

16. The salt composition of claim 15, wherein the chloride salt is selected from the group consisting of a chloride of potassium, magnesium, calcium, ammonium, and combinations thereof.

17. The salt composition of claim 16, wherein the chloride salt is magnesium and potassium chloride.

18. The salt composition of claim 16, wherein the chloride salt is potassium chloride.

19. The salt composition of claim 15, wherein the food grade acidulant is selected from the group consisting of citric acid, malic acid, tartaric acid, fumaric acid, lactic acid, acetic acid, benzoic acid and combinations thereof.

20. The salt composition of claim 19, wherein the food grade acidulant is citric acid.

21. The salt composition of claim 15, wherein the carrier is a starch molecule.

22. The salt composition of claim 15, wherein the carrier is selected from the group consisting of a dextrin, maltodextrin, and combinations thereof.

23. The salt composition of claim 22, wherein the carrier is a maltodextrin.

24. The salt composition of claim 15, wherein the carrier is selected from the group consisting of a monosaccharide, disaccharide, and combinations thereof.

25. The salt composition of claim 15, wherein the carrier is a cereal starch.

26. The salt composition of claim 25, wherein the cereal starch is selected from the group consisting of rice starch, rice cereal, rice flour and combinations thereof.

27. The salt composition of claim 15, wherein the composition contains about 10-90%, lower sodium than regular salt.

28. The salt composition of claim 27, wherein the composition contains about 25%, 30%, 35%, 45%, 50%, 55% or 75% lower sodium than regular salt.

29. The salt composition of claim 27, wherein the composition contains about 33%, 35%, 45%, 50%, 55% or 66% lower sodium than regular salt.

30. The salt composition of claim 27, wherein the composition contains about 40%, 42%, 45%, 47%, 48%, 49%, 50%, 51%, 52%, 53%, 54%, 55%, 57% or 60% lower sodium than regular salt.

31. The salt composition of claim 27, wherein the composition contains about 50% less sodium than regular salt.

32. The salt composition of claim 25, wherein the salt composition is liquid form.

33. The salt composition of claim 25, wherein the salt composition is solid form.

34. A food product comprising the salt composition of claim 25.

35. The food product of claim 34, wherein the food product is selected from the group consisting of spice mixtures, soups, sauces, baked goods, meat products, dairy products, breakfast cereals, and table salt.

36. A salt composition, comprising:
   a. a modified chloride salt, wherein the modified chloride salt consists of from about 15% to about 90% by weight chloride salt, about 0.1% to about 5% by weight food grade acidulant, and about 10% to about 25% by weight carrier, wherein the modified chloride salt comprises a homogeneous amalgamated particle of chloride salt, food grade acidulant, and carrier, and wherein the modified chloride salt does not contain sodium chloride; and,
   b. sodium chloride, wherein the sodium chloride is not heat processed with the modified chloride salt.

37. The salt composition of claim 36, wherein the chloride salt is selected from the group consisting of a chloride of potassium, magnesium, calcium, ammonium, and combinations thereof.

38. The salt composition of claim 37, wherein the chloride salt is magnesium and potassium chloride.

39. The salt composition of claim 37, wherein the chloride salt is potassium chloride.

40. The salt composition of claim 36, wherein the food grade acidulant is selected from the group consisting of citric acid, malic acid, tartaric acid, fumaric acid, lactic acid, acetic acid, benzoic acid and combinations thereof.

41. The salt composition of claim 40, wherein the food grade acidulant is citric acid.

42. The salt composition of claim 36, wherein the carrier is a starch molecule.

43. The salt composition of claim 36, wherein the carrier is selected from the group consisting of a dextrin, maltodextrin, and combinations thereof.

44. The salt composition of claim 43, wherein the carrier is a maltodextrin.

45. The salt composition of claim 36, wherein the carrier is selected from the group consisting of a monosaccharide, disaccharide, and combinations thereof.

46. The salt composition of claim 36, wherein the carrier is a cereal starch.

47. The salt composition of claim 46, wherein the cereal starch is selected from the group consisting of rice starch, rice cereal, rice flour and combinations thereof.

48. The salt composition of claim 36, wherein the composition contains about 10-90%, lower sodium than regular salt.

49. The salt composition of claim 48, wherein the composition contains about 25%, 30%, 35%, 45%, 50%, 55% or 75% lower sodium than regular salt.

50. The salt composition of claim 48, wherein the composition contains about 33%, 35%, 45%, 50%, 55% or 66% lower sodium than regular salt.

51. The salt composition of claim 48, wherein the composition contains about 40%, 42%, 45%, 47%, 48%, 49%, 50%, 51%, 52%, 53%, 54%, 55%, 57% or 60% lower sodium than regular salt.

52. The salt composition of claim 48, wherein the composition contains about 50% less sodium than regular salt.

53. The salt composition of claim 36, wherein the salt composition is liquid form.

54. The salt composition of claim 36, wherein the salt composition is solid form.

55. A food product comprising the salt composition of claim 36.

56. The food product of claim 55, wherein the food product is selected from the group consisting of spice mixtures, soups, sauces, baked goods, meat products, dairy products, breakfast cereals, and table salt.

57. A salt composition, comprising:
 a. a modified chloride salt, wherein the modified chloride salt consists of from about 30% to about 90% by weight chloride salt, about 2% to about 5% by weight food grade acidulant, and about 10% to about 20% by weight carrier, wherein the modified chloride salt comprises a homogeneous amalgamated particle of chloride salt, food grade acidulant, and carrier, and wherein the modified chloride salt does not contain sodium chloride; and,
 b. sodium chloride, wherein the sodium chloride is not heat processed with the modified chloride salt.

58. A salt composition, comprising:
 a. a modified chloride salt, wherein the modified chloride salt consists of from about 70% to about 90% by weight chloride salt, about 2.5% to about 5% by weight food grade acidulant, and about 10% to about 20% by weight carrier, wherein the modified chloride salt comprises a homogeneous amalgamated particle of chloride salt, food grade acidulant, and carrier, and wherein the modified chloride salt does not contain sodium chloride; and,
 b. sodium chloride, wherein the sodium chloride is not heat processed with the modified chloride salt.

59. A salt composition, comprising:
 a. a modified chloride salt, wherein the modified chloride salt consists of about 80% by weight chloride salt, about 3.5% by weight food grade acidulant, and about 15% by weight carrier, wherein the modified chloride salt comprises a homogeneous amalgamated particle of chloride salt, food grade acidulant, and carrier, and wherein the modified chloride salt does not contain sodium chloride; and,
 b. sodium chloride, wherein the sodium chloride is not heat processed with the modified chloride salt.

* * * * *